United States Patent
Leman et al.

(10) Patent No.: US 11,770,081 B2
(45) Date of Patent: Sep. 26, 2023

(54) BRAKING OF SINGLE COIL BLDC MOTORS

(71) Applicant: Melexis Bulgaria Ltd, Sofia (BG)

(72) Inventors: Dirk Leman, Tessenderlo (BE);
Dimitar Vladimirov Todorov, Sofia (BG)

(73) Assignee: MELEXIS BULGARIA LTD, Sofia (BG)

( * ) Notice: Subject to any disclaimer, the term of this patent is extended or adjusted under 35 U.S.C. 154(b) by 70 days.

(21) Appl. No.: 17/463,960

(22) Filed: Sep. 1, 2021

(65) Prior Publication Data

US 2022/0069749 A1 Mar. 3, 2022

(30) Foreign Application Priority Data

Sep. 1, 2020 (EP) .................................... 20472011

(51) Int. Cl.
*H02P 6/182* (2016.01)
*H02K 11/25* (2016.01)
*H02K 11/33* (2016.01)
*H02P 6/08* (2016.01)

(52) U.S. Cl.
CPC .............. *H02P 6/182* (2013.01); *H02K 11/25* (2016.01); *H02K 11/33* (2016.01); *H02P 6/085* (2013.01)

(58) Field of Classification Search
CPC ......... H02P 6/182; H02P 6/085; H02K 11/25; H02K 11/33
See application file for complete search history.

(56) References Cited

U.S. PATENT DOCUMENTS

| | | | |
|---|---|---|---|
| 2011/0006712 A1 | 1/2011 | Weissbach et al. | |
| 2016/0111989 A1 | 4/2016 | Gohara et al. | |
| 2018/0287523 A1* | 10/2018 | Leman | H02P 6/20 |
| 2019/0356249 A1* | 11/2019 | Linggajaya | G11B 19/2081 |

FOREIGN PATENT DOCUMENTS

EP 3382885 A1 3/2018

OTHER PUBLICATIONS

Search Report and Written Opinion from corresponding European Application No. 20472011.4, dated Jan. 7, 2021.

* cited by examiner

*Primary Examiner* — Zoheb S Imtiaz
(74) *Attorney, Agent, or Firm* — WORKMAN NYDEGGER (57) ABSTRACT

A method for braking a single coil BLDC motor includes iterating a plurality of times through a sequence of: a braking state which lasts a braking period; and a high impedance state which lasts a cool down period. The current runs through the single coil during the braking state and no current runs through the single coil during the high impedance state. The transiting from the braking state to the high impedance state is done when the motor operates in generator mode.

14 Claims, 8 Drawing Sheets

BRAKING OF SINGLE COIL BLDC MOTORS

FIELD OF THE INVENTION

The invention relates to the field of single coil brushless direct current (BLDC) motors. More specifically it relates to a method and device for braking a single coil BLDC motor.

BACKGROUND OF THE INVENTION

When braking BLDC motors after having driven the BLDC motor, the inductive and kinetic energy from the BLDC motor needs to be removed in a safe way. In several applications it is not allowed or not possible to push back this energy into the power supply of the BLDC motor.

The standard solution is to stop driving the motor, and let it stop by its own load (friction, etc.).

In some applications it is preferred or necessary to brake the motor as fast as possible. Typical applications are high speed fans which are hot unplugged for servicing. Such high speed spinning fans are hazardous for the servicing engineers. Other applications are fans which need a fast direction change, either due to a wind milling situation, or because the air flow direction needs to be inverted such as in home ventilation applications.

When the problem of braking a motor as fast as possible is tackled for multi-phase BLDC motors (e.g. 3-phase motors), the fact that these coils are interconnected in a star or delta configuration is typically exploited.

This is, however, not possible in single coil motors as they only have one motor coil.

For low power 1-coil motors, typically the full bridge is switched to freewheeling to brake the motor. For low power motors the maximum freewheeling phase current ($I_{phase,fw}$) should not exceed a maximum current ($I_{phase,max}$):

$$I_{phase,fw} = \frac{V_{BEMFmax}}{R_{total}} < I_{phase,max}$$

In the equation $V_{BEMFmax}$ is the maximum back electromotive force generated voltage and $R_{total}$ is the total of the coil resistance and the driver resistance. For high power motors this total resistance is small resulting in a high braking current which should be limited to protect the H-bridge driver from an overcurrent condition A first braking condition for single coil motors, assumes the 1-coil BLDC motor is being actively driven by an H-Bridge output driver, prior to initiating the braking. In such case the motor coil is charged with inductive energy, proportional to the square of the phase current $E_{inductive} = I_{phase}^2$.

A first method switches the H-Bridge driver immediately to a state in which the current path through the motor coil is interrupted, and the inductive energy is instantaneously discharged into the supply, referred to as a flyback pulse. The interruption of the current path can be done in several ways, for instance by opening one of the two conducting transistors. In either case the current will persist flowing through the body diodes of the opposing transistors, which may optionally be turned on as well.

While the flyback pulse is few µs up to ms depending on the inductance of the motor, the kinetic energy is converted to current by the BEMF voltage which is induced into the coil. After the flyback pulse has been discharged from the coil, the BEMF voltage will induce a generator mode current if a conductive path exists. To avoid such conductive path all four transistors have to remain switched OFF leaving the H-bridge in High Impedance mode (HiZ).

In case the flyback energy is not allowed to flow back into the supply, a decoupling capacitance is provided which accumulates this flyback energy charge, implying a rise in supply voltage. In a generic case a typical decoupling capacitance of few µF may be insufficient to prevent exceeding the maximum allowed operating voltage. State of the art Industry standard CMOS technologies used for integrated motor controllers range from 1.0 µm to 0.1 µm feature size and smaller. Such small feature size technologies are standard available with maximum operating voltages up to 16V or 18V or 20V, targeting 12V applications, and with maximum operating voltages up to 28V, 32V and 40V or 50V for 24V applications, or automotive 13.6V battery solutions, or for Li-ion based battery solutions with up to 8 cells in series, and voltages up to 60V for 48V applications. 60V is a legal safe maximum operating limit. In case the operating voltage can rise above this 60V safe limit, special precautions have to be foreseen to protect the end user/consumer, which complicate the designs and are therefore avoided as much as possible. Alternatively applications running directly on the mains (100 Vac up to 240 Vac) require dedicated technologies that are able to operate up to 200V and 400V respectively, and need dedicated isolations against short higher voltage spikes. Also these technologies have a limited overvoltage level. The higher the overvoltage typically the less standard are the available technologies, and are therefore not preferred. A first prior art solution to limit the overvoltage is to increase the size of the decoupling capacitance.

In order to avoid such high overvoltage levels, the decoupling capacitors size can be increased. However adding high amounts of decoupling capacitors is not obvious to integrate on integrated circuit boards which fit into the limited space inside such fan/pump designs.

For increasing motor power, for instance 2A motors at 12V or 24V, in combination with motors of increasing coil inductance (for instance 0.1 mH, 0.5 mH, or 2 mH, or 10 mH, or 20 mH), the inductive energy $(L \ast I^2)/2$ is increasing.

As the inductive energy is increasing, the preferred prior art solution is to apply a supply clamping circuit to protect the output driver and the motor coil from an overvoltage condition which might damage the driver or capacitor or motor. Typically a Transient Voltage Suppressor (TVS) is applied external to the driving circuit. Mind also that as the clamping voltage increases, also the dissipated energy $(I_{phase} \ast V_{clamp})$ in the clamp increases, and clamping structures become larger to absorb the amount of energy. Such an external TVS clamp has a wide voltage range, which is depending for instance on its production tolerances, its junction temperature, and the actual clamping current. This variation requires extra margin on the H-bridge driver between the maximum required operation voltage, and the breakdown voltage of the H-bridge driver technology.

In such first braking method, the 1-coil BLDC motor can slow down due to its external load, and due to friction in the bearing. While at high speeds the load is significant to slow down the fan/pump, this load becomes negligible at low speeds. The friction then defines the time until the motor comes to a full stop. This time can be heavily depending on the age of the bearing, and the viscosity of the bearing lubricant. This viscosity changes exponentially with temperature. Therefore the tail of such coasting method time can vary widely, which may not be acceptable in the application as cited above.

When the motor is driven by an external load this is referred to as wind milling. In some cases an external load may spin the motor in the opposite direction prior to start up. To start up the 1-coil motor in the correct direction, the motor must brake to come to a full stop, prior to starting up in the other direction.

Therefore a second braking method, referred to as passive braking, which is optionally combined with the first braking method, consists of creating a recirculating path in the full bridge. This can be either by switching on the low side transistors (LS), or the high side transistors. In other implementations a body diode of one of the LS (HS) transistors can be used, in complement with activation of the other LS (HS) FET to create the recirculation path.

After consuming any left-over driving-current from a previous active driving state, the BEMF voltage ($V_{BEMF}$) which is induced into the motor coil by the rotating magnetic field from the rotor, induces a generator mode current defined by $$I_{phase,fw} = \frac{V_{BEMFmax}}{R_{total} + R_{driver}},$$

For applications with high BEMF voltage, and small coil resistance such conditions lead to excessive coil current exceeding the maximum operating conditions.

For instance in 24V applications, $V_{BEMF}$ can be as high as 20V or more, and for applications with a nominal motor current of for instance 1A, the total loop resistance ($R_{coil}$+$R_{driver}$) can be less than 1 Ohm, leading to phase currents of 20 A and more, which may be exceeding the maximum operating currents which are typically in the range of 1.5 to 5 times the nominal motor current for integrated drivers, and in the range of 3 to 10 times the nominal current for the motor coil before demagnetizing the rotor or overheating the coil windings. Exceeding the maximum operating currents will lead to overheating, and eventually damaging the driving circuit and/or the motor coil.

In the prior art solutions above two braking methods are configured in EEPROM based on fan/pump characterization under worst case conditions. Therefore in typical operating conditions it would be possible to stop the fan/pump faster.

Also the definition of the worst case corner conditions is not always evident, and may require extensive characterization efforts and analysis.

In more advanced solutions the motor controller estimates or measures the actual motor speed to assess the BEMF voltage. As soon as $V_{BEMF}$ has dropped below a certain threshold, the motor controller switches to recirculation.

Still this requires careful assessment of what is the maximum allowed $V_{BEMF}$ for corner conditions such as ambient temperature which might influence the total resistance as much as 75% between cold ($T_a$=–40° C.) and hot ($T_a$=125° C.). Also the load may vary as a function of the temperature, such as is the case for pump applications in particular, while the friction load in case of fans is not negligible. For each new fan/pump design therefore a dedicated characterization effort is required. Also the design engineers developing the fan may not be so familiar with the behavior of integrated semiconductors. And therefore extra margin will be applied in order to simplify the characterization.

Finally in above mentioned wind milling conditions in which the fan is spinning in the wrong direction prior to start up, it may be that the fan is permanently exceeding such $V_{BEMF}$ threshold, making such braking methods ineffective.

Therefore there is a need for a more intelligent braking method.

SUMMARY OF THE INVENTION

It is an object of embodiments of the present invention to provide a good braking method and device for braking of single coil BLDC motors.

The above objective is accomplished by a method and device according to the present invention.

In a first aspect embodiments of the present invention relate to a method for braking a single coil BLDC motor. The method comprises iterating a plurality of times through a sequence of:
   a braking state which lasts a braking period,
   and a high impedance state which lasts a cool down period,
   wherein current runs through the single coil during the braking state and wherein no current runs through the single coil during the high impedance state,
   and wherein transiting from the braking state to the high impedance state is done when the motor operates in generator mode.

In embodiments of the present invention the single coil BLDC motor comprises a rotor with permanent magnets.

Such a scheme wherein a sequence of a braking state and a high impedance state is executed a plurality of times allows to prevent overheating of the motor while at the same time providing efficient braking of the motor.

In a second aspect embodiments of the present invention relate to a motor driver for driving a single coil BLDC motor, the motor driver comprising:
   a controller,
   a full bridge output driver comprising a pair of high side transistors and a pair of low side transistors connected with the single coil for controlling a current through the coil,
   wherein the controller is configured for switching the transistors of the full bridge driver for braking the motor, thereby iterating a plurality of times through a sequence of a braking state which lasts a braking period and a high impedance state which lasts a cool down period, wherein current runs through the single coil during the braking state and wherein no current runs through the single coil during the high impedance state and wherein transiting from the braking state to the high impedance state is done when the motor operates in generator mode.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 9:
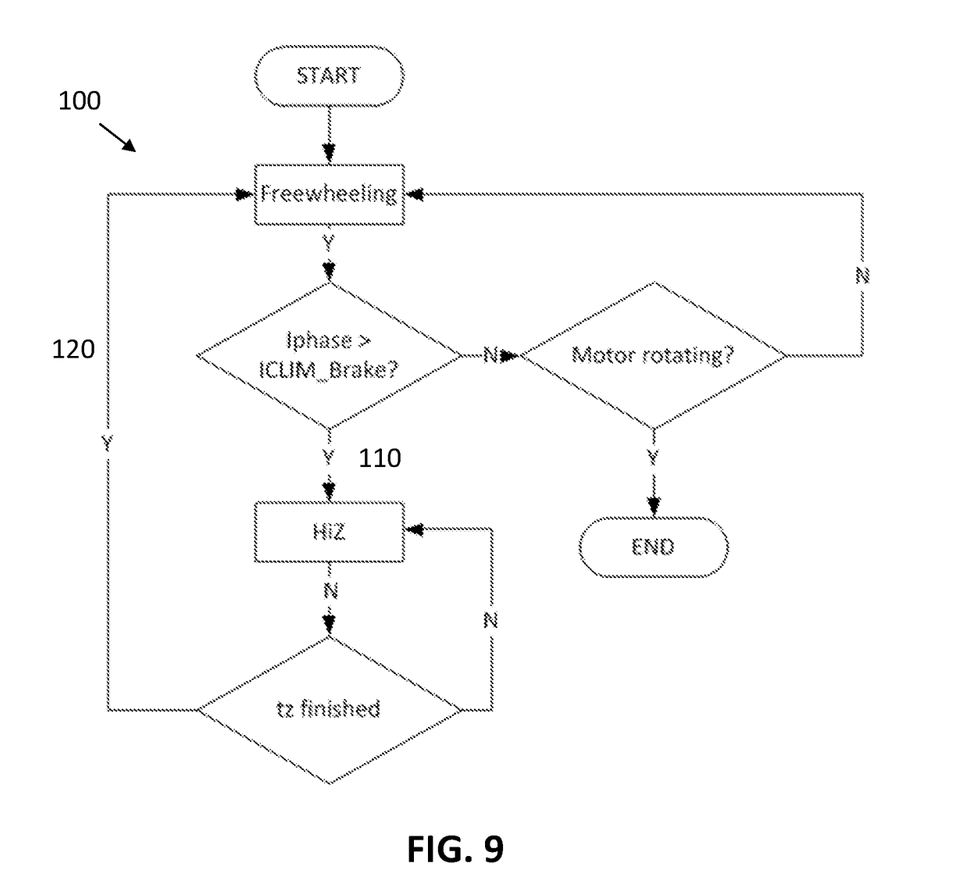
FIG. 9 shows a flow chart of an exemplary method in accordance with embodiments of the present invention.

In a first aspect embodiments of the present invention relate to a method 100 for braking a single coil BLDC motor, the method 100 comprising iterating a plurality of times through a sequence of:
  a braking state which lasts a braking period,
  and a high impedance state which lasts a cool down period,
  wherein current runs through the single coil during the braking state and wherein no current runs through the single coil during the high impedance state,
  and wherein transiting 110 from the braking state to the high impedance state is done when the motor operates in generator mode. A flow chart of an exemplary method in accordance with embodiments of the present invention is shown in FIG. 9.

It is an advantage of embodiments of the present invention that a sequence of a braking state and a high impedance state is executed a plurality of times when braking the motor. This allows to prevent overheating of the motor while at the same time providing efficient braking of the motor. Transiting from the braking state to the high impedance state is done when the current through the coil is inversed such that the motor operates in generator mode. This may for example be done when a current limit is crossed. When switching from the braking state to the high impedance state this will result in a flyback pulse. After the flyback pulse no current will flow through the coil and the motor will cool down. By providing a sequence of braking states and high impedance states, efficient braking can directly be followed by cool down of the motor.

In embodiments of the present invention transiting 110 from the braking state to the high impedance state may be done when a current threshold (e.g. ICLIMBrake) is reached.

A method according to embodiments of the present invention may comprise absorbing a flyback pulse induced by transiting 110 from the braking state to the high impedance state such that a supply voltage of the motor is clamped to a maximum voltage. This is referred to as the clamping function. The cool down period and/or the current threshold may be adjusted in function of a signal indicative of an operating temperature induced by the clamping function.

In embodiments of the present invention the flyback pulse current may be blocked by a reverse polarity function and/or by an inductive load.

In embodiments of the present invention it may be that the push back of current in the supply should be avoided.

It is advantageous that, in case no or limited current is allowed or able to flow back into the supply, this invention describes a method or device which takes advantage of a supply clamp and a configurable current limiting function to bring a 1-coil BLDC motor to a full stop in a fast but controlled and thus safe way.

In embodiments of the present invention transiting from the high impedance state to the braking state is done such that the ratio of the cool down period and the braking period is at least 5%.

In embodiments of the present invention the cool down time may scale up as the device gets hotter.

In a second aspect embodiments of the present invention relate to a motor driver 200 for driving a single coil BLDC motor, the motor driver 200 comprising:
- a controller 210,
- a full bridge output driver 220 comprising a pair of high side (HS) transistors and a pair of low side (LS) transistors connected with the single coil for controlling a current through the coil,
- wherein the controller 210 is configured for switching the transistors of the full bridge driver for braking the motor, thereby iterating a plurality of times through a sequence of a braking state which lasts a braking period and a high impedance state which lasts a cool down period, wherein current runs through the single coil during the braking state and wherein no current runs through the single coil during the high impedance state and wherein transiting from the braking state to the high impedance state is done when the motor operates in generator mode.

Figure 1:
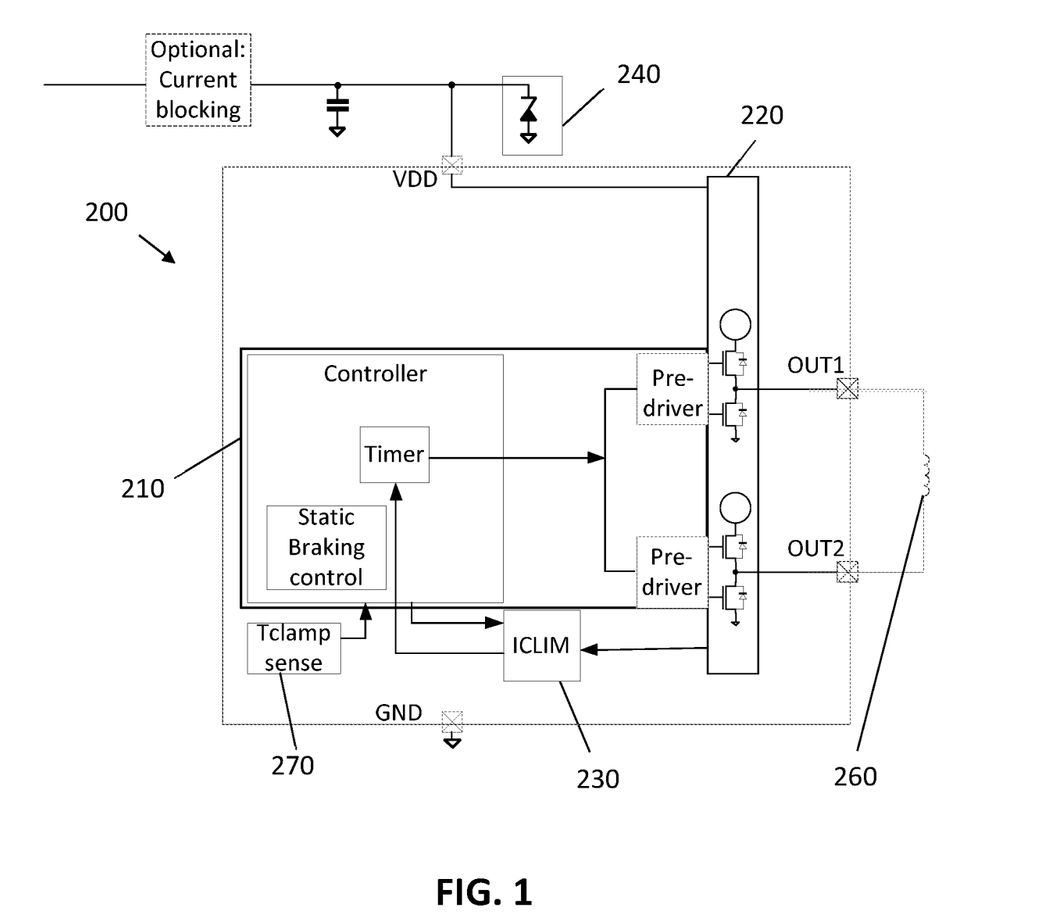
FIG. 1 shows a block diagram of an exemplary motor driver in accordance with embodiments of the present invention.
Figure 2:
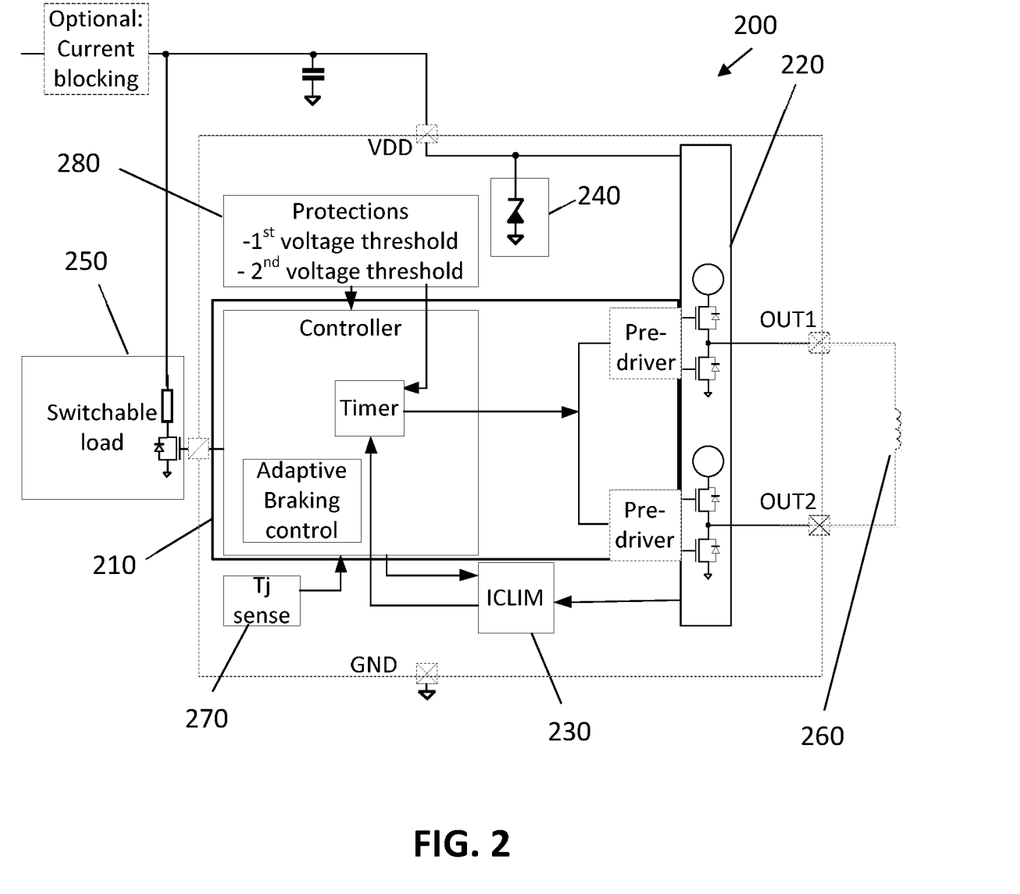
FIG. 2 shows a block diagram of an exemplary motor driver in accordance with embodiments of the present invention wherein the current limiter, the clamping function, the controller and the output driver are integrated in a single package.

In embodiments of the present invention the controller functionality not necessarily needs to be implemented in one component. Controlling of the transistors may for example be implemented in a first component, while control of thresholds such as current thresholds and voltage thresholds may be implemented in a separate component. Schematic drawings of motor drivers in accordance with embodiments of the present invention are shown in FIG. 1 and FIG. 2.

In embodiments of the present invention the controller 210 may be configured for switching the motor to a braking state by
- switching on both high side transistors, both low side transistors, or switching on one high side transistor or one low side transistor, such that the current can recirculate through the transistor which is switched on, and the body diode of the opposing high side, respectively low side transistor, or by
- active braking in which the transistors are switched such that a current path is generated by the BEMF voltage of the rotating motor, such that the motor is in generator mode.

In that case the current flows from the ground towards the supply.

In embodiments of the present invention the motor driver may comprise a current limiter 230 which is configured for triggering the controller to switch from the braking state to the high impedance state when the phase current reaches a current threshold.

In embodiments of the present invention the motor driver 200 may comprise a clamp 240 which is configured for limiting a maximum voltage which is applied to the full bridge output driver, by providing a drain path to current caused by a flyback pulse induced by transiting 110 from the braking state to the high impedance state.

This flyback pulse is induced by the inductive energy stored in the coil of the 1-coil motor, and/or the BEMF voltage which is present in the 1-coil motor in which the permanent magnetized rotor is rotating at a speed not equal to zero.

In embodiments of the present invention the supply clamp 240, the current limiter 230, and the full bridge (H-bridge) output driver may be realized as discrete solutions around a controller 210. The controller may for example be a state machine or a microcontroller based motor controller.

In embodiments of the present invention, a current limit function is combined with an integrated supply clamping structure in order to realize an adaptive braking function which allows to bring a 1-coil BLDC motor to a full stop.

It is an advantage of embodiments of the present invention that they leverage the combination of a current limit with a supply clamp to bring a 1-coil BLDC motor to a full stop. It is an advantage of embodiments of the present invention that this can be achieved under a plurality of circumstances (different operating conditions within the operating area or process variations).

In further implementations according to this invention, the controller may be integrated with the H-bridge output driver, and the current limiting function as a monolithic solution, or as a multi-die solution within one semiconductor package (such as SOIC or QFN or TSSOP or TQFP etc.), in combination with an external clamp (such as a TVS).

Embodiments of the present invention are in particular of interest for drivers where the clamping structure is integrated into the full bridge driver. Applications may be applications where the driver can be integrated in a monolithic solution combining the controller as well as the full bridge into a single integrated circuit (IC). An application range may for example by up to 2 A, or max 3 A range for the coil current, and 5V, 12V, 24V, or even 48V for the supply voltage. Operating power may for example be up to 50 W, or even up to 100 W and more. The latter may be achieved by combining in one package different technologies which allow to increase the power range to 100 W and more. For instance combining Galium Nitride Field Effect Transistors (GaN FETs) with Silicon controllers into a single semiconductor package.

The clamp may be realized as a Zener breakdown based clamp. Alternatively the clamp may also be realized by an amount of capacitors which is so high that the FET breakdown voltage is never reached during a braking sequence. The total required capacitance may be characterized/validated during motor design. In the latter case clamp overheating implies overheating of the capacitors. Heating of the capacitors is significantly smaller than heating of a Zener breakdown based clamp.

FIG. 1 shows a block diagram of an exemplary motor driver for a single coil BLDC motor in accordance with embodiments of the present invention. It shows the single coil 260, the H-bridge driver 220, a Zener diode 240 for clamping, a controller 210 for braking in accordance with embodiments of the present invention, a current limiting function 230, and a clamp temperature sensor.

In embodiments of the present invention the cool down period may be set by the controller. The controller may be implemented in one component or in several components. The timer may for example be implemented in a separate component.

In embodiments of the present invention the motor driver may comprise a load 250, and the controller 220 is configured for connecting the load parallel 250 with the motor when a supply voltage of the motor reaches a first predefined voltage level and disconnecting the load 250 when the supply voltage drops below a second predefined voltage level.

FIG. 2 shows a block diagram of an exemplary motor driver in accordance with embodiments of the present invention. In this example the motor driver has an integrated device which implements the clamping function 240 (in the description the device itself is also referred to as the clamping function 240, when reference is made to the motor driver device), a controller 210 with adaptive braking control, and an optional external switchable load 250. In FIG. 2 the current limiter 230, and the clamping function 240 are integrated with the controller 210 and the H-bridge output driver 220 in a single package.

In the implementation of FIG. 2 the controller has access to a sensor signal indicative of the junction temperature $T_j$ of the clamping function. For instance if the clamping function is realized as linearly controller H-bridge driver FETs, the IC junction temperature can be used as signal indicative of the clamp temperature.

In the exemplary embodiment illustrated in FIG. 2, the optional external load 250 can be controlled by the controller 210. This external load can be switched on to drain energy from the decoupling capacitor. This creates a parallel draining path in addition to a clamping structure. Such external load will reduce the energy to be dissipated in the clamping structure, which can be especially beneficial if the clamp is integrated. Additionally, the load can reduce the voltage below the clamping level (e.g. a first predefined voltage level), until some undervoltage level is achieved (e.g. a second predefined voltage level). These thresholds are illustrated in FIG. 2 by the protections 280. These may for example be stored in memory. The external load may be used to reduce the voltage level. For instance, in case of a 12V application, and a clamping level at 40V, the clamp will only limit the voltage to 40V. The consumption of the electronics is the only means to reduce the voltage downwards from 40V. With this external load, the supply voltage can be reduced to just above the supply voltage if this is present, for instance 13V, or in case of hot unplug where no supply is present, it can be further reduced to just above the power on reset level of the electronics, for instance 5V.

This load can also be integrated. In this case the heat source is still in the same package, and therefore the benefit from splitting the heat may be less compared to an external load.

Figure 7:
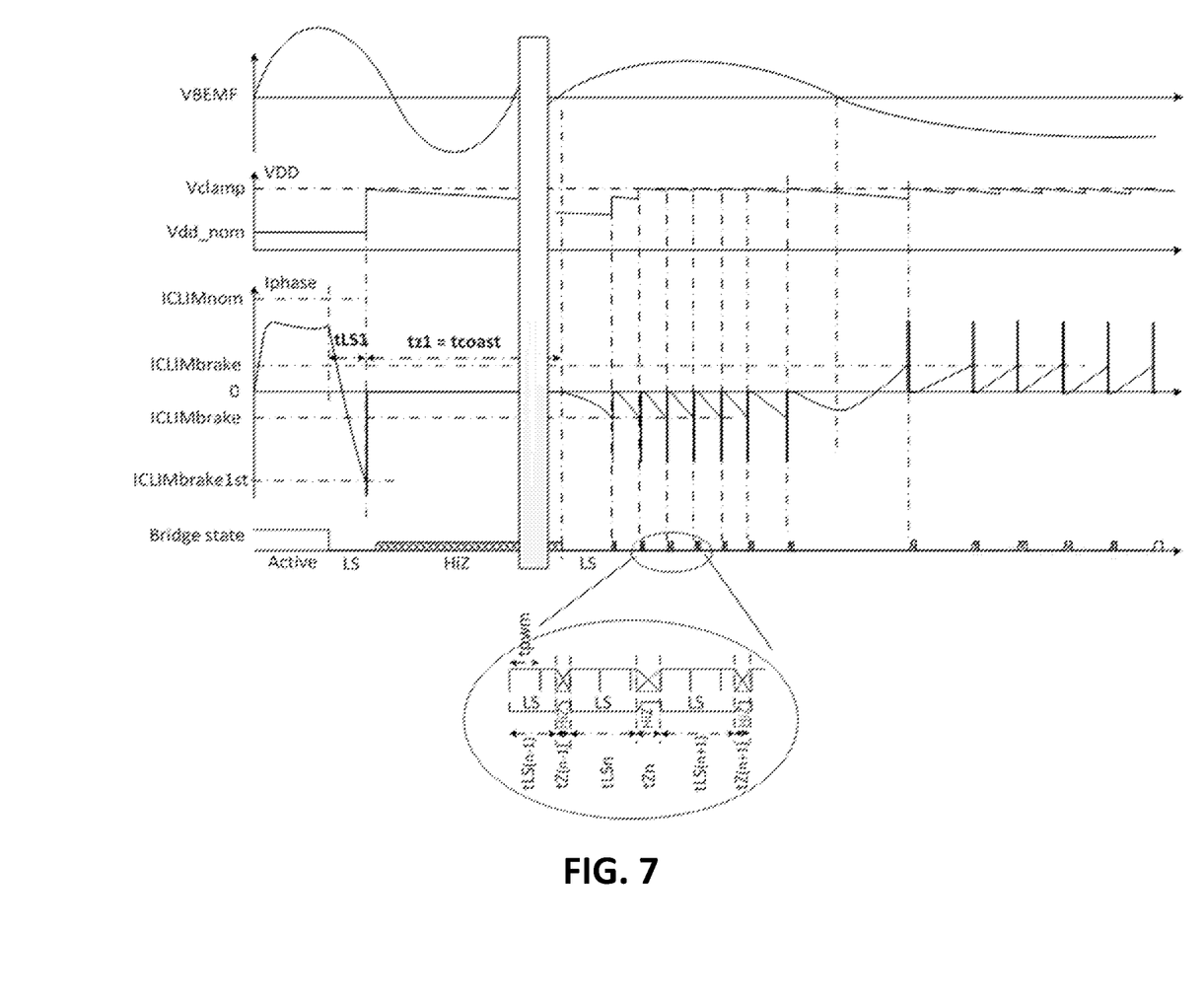
FIG. 7 shows traces of operational parameters obtained when driving a single coil brushless DC motor using a method or device implementing such a method, in accordance with embodiments of the present invention, wherein the initial coasting time is larger than the subsequent cool down periods and wherein the absolute value of the initial current threshold is larger than the absolute value of the subsequent current thresholds.

Such load can be particularly of interest for methods according to FIG. 7, in which the sequence of flyback pulses is so fast that the supply voltage cannot be lowered significantly by the self-consumption of the electronics. Some examples on how such loads can be realized are, a pure resistive load with a switch, or a linear regulated transistor.

Figure 3:
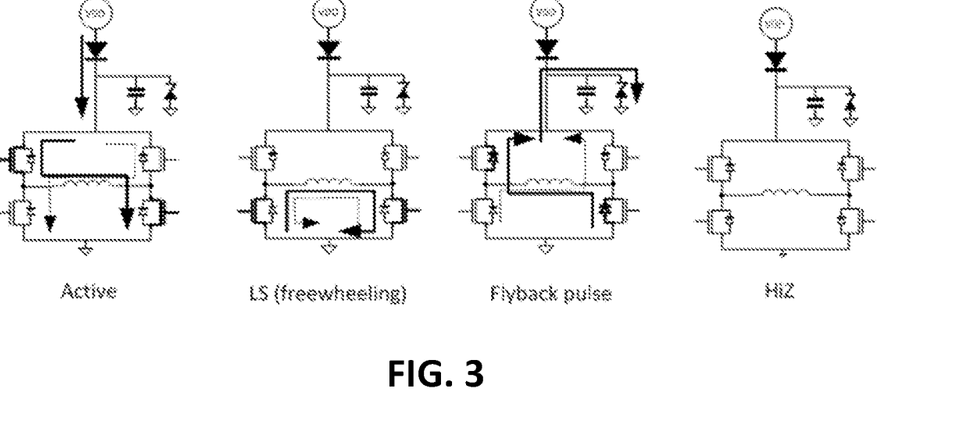
FIG. 3 schematically shows full bridge output driver states which may be applied in a method according to embodiments of the present invention.

In embodiments of the present invention the controller is configured for switching the transistors of the full driver such that it changes from an active state to an iterative braking sequence. There iterating a plurality of times through a sequence of a braking state which lasts a braking period and a high impedance state which lasts a cool down period. FIG. 3 schematically shows full bridge output driver states which may be applied in a method according to embodiments of the present invention. As illustrated in these schematic drawings a flyback pulse is generated when transiting from the braking state (LS) to the high impedance state (HiZ).

In a preferred embodiment, the transistors of the full bridge output driver 220 (H-bridge output driver) are reused to realize the clamping function. This allows to reduce the size of the motor driver, thereby simplifying the system integration. The controller may be configured for controlling the transistors of the full bridge driver such that they are reused for the clamping function. This may for instance be achieved by regulating at least two of the transistors in linear mode to create a path from the supply to the ground, thus dissipating the excess energy inside these transistors. Either the two transistors in the same leg of the half bridge may be switched on, to avoid current flowing through the coil or a HS transistor on one side, can be combined with a LS transistor on the other side, for instance in active configuration, to take benefit of BEMF voltage, and reduce the voltage drop over the transistors, and thus limit the self-heating. Disadvantage of such method is that the motor will slightly accelerate again. In another implementation, the both legs are switched on, which is beneficial over a single leg in that the dissipation is spread over more transistors, as to minimize the chance for local overheating.

A benefit form integrating the clamp into the H-bridge driver is that the clamp tolerances can be designed to scale with the process tolerances of the H-bridge driver, and as such less margin is required between the maximum supply operating range and the breakdown voltage of the H-bridge driver technology. On the other hand, the maximum amount of flyback energy which can be absorbed is more limited compared to the application of an external TVS, which can be freely selected from a wide range of power ranges.

Figure 4:
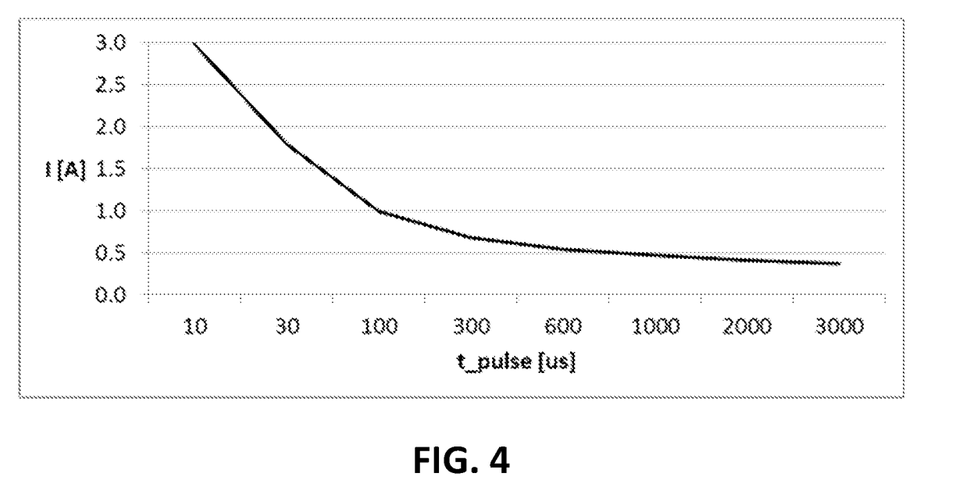
FIG. 4 shows an example of the safe operating area of an integrated clamp for a single energy pulse, defined by the maximum allowed peak current as function of the flyback pulse width.

The capability of a clamp to absorb flyback pulse energy is defined by its Safe Operating Area (SOA), which is set by the maximum energy absorption capability. Damages are introduced from exceeding the SOA and in particular from overheating of the clamp. FIG. 4 shows an example of a SOA of an integrated clamp for a single energy pulse, defined by the maximum allowed peak current as function of the flyback pulse width. The length of the short flyback pulse is defined by the amount of inductive energy stored into the motor coil, the present BEMF voltage and the resistive load in the flyback path. It can range from as short as 1 μs up to multiple ms.

For instance:

For a single pulse up to 10 μs, a peak current of 3.0 A, corresponding to about 5 mW can be absorbed.

For a single pulse up to 100 μs, a peak current up to 1.0 A corresponding to about 17 mW, can be absorbed, For a single pulse up to 3 ms, a peak current up to 0.4 A corresponding to about 74 mW, can be absorbed.

In embodiments of the present invention the controller may be configured to adjust the cool down period in function of a signal indicative of an operating temperature of the motor. This may for example be the junction temperature of the clamping device or the temperature obtained using a temperature sensor or another signal which is indicative for the temperature of the motor.

In embodiments of the present invention the controller may be configured to adjust the current threshold in function of a signal indicative of an operating temperature of the motor.

In preferred embodiments of this invention, the controller has access to the clamp instant temperature. Since heating of the clamp is very fast, integration of the controller with the clamp is beneficial for implementation of a feedback loop with a response rate which is sufficiently fast to avoid overheating. Examples of methods how the controller can then adjust the adaptive braking function to avoid overheating are for instance by adjusting the cool down temperature, or by adjusting the ICLIM threshold (ICLIMbrake). Optionally, the controller can be designed to maximize the braking to approach the SOA as much as possible, for instance by increasing ICLIM to a maximum level (ICLIMmax), or reducing the cool down times.

Another way to represent a SOA, is to make assumptions on the worst case resistance and BEMF voltage, for instance by selecting Rcoil=0 Ohm, and BEMF voltage=VDD. Such an example is given in the table below, in which the SOA is defined by limiting the maximum allowed inductance value which can be combined for a given current limit (ICLIM) and a given maximum supply voltage. The current limit ensures the phase current never exceeds the predefined ICLIM threshold.

| Lmax | VDD = 5 V | VDD = 12 V | VDD = 18 V | VDD = 24 V | VDD = 32 V |
| --- | --- | --- | --- | --- | --- |
| ICLIM = 1500 mA | 19 mH | 15.9 mH | 12.9 mH | 10.7 mH | 7.3 mH |
| ICLIM = 2000 mA | 7.3 mH | 6.0 mH | 5.0 mH | 4.1 mH | 3.0 mH |
| ICLIM = 2200 mA | 5.0 mH | 4.5 mH | 3.7 mH | 3.0 mH | 1.9 mH |

The safe operating area of the clamp is defined by the thermal capacitances and resistances of the clamp structure itself, of its package and of its environment such as its PCB and eventual overmoulding compound. In practice the thermal capacity of a clamp structure may be enough to buffer the majority of the heating for a single pulse at the edge of its SOA. Such pulse will heat up the clamping structure close to its absolute maximum operating temperature. A single pulse is defined such that after the single pulse, sufficient time is applied for the clamp to substantially cool down again through its thermal resistance paths, prior to receiving a next pulse, such that no heat is accumulated in the sequence of pulses. In case pulses are repeated such that heating is accumulated, the thermal capacity will be insufficient, and therefore the SOA may be significantly lower. The flyback pulse energy may be 10 times, or 100 times or more lower for a sequence of flyback pulses, compared to a single flyback pulse. When referring to a SOA defined by the ICLIM value, this implies that a lower Current Limit must be applied for a given motor coil inductance when applying a repeated sequence of flyback pulses, for instance with minimum intervals of 20 μs or 50 μs or 100 μs or 500 μs, compared to the allowed ICLIM value for a single flyback pulse.

The ICLIMbrake value for repeated pulses is typically lower than the maximum allowed ICLIMnom during nominal operation for an integrated clamp. For instance for applications with ICLIMnom=2 A, ICLIMbrake may be less than 500 mA. Therefore, a preferred embodiment according to this invention implies a ICLIM function which can be adjusted depending on the operating mode between normal operation and braking.

Figure 5:
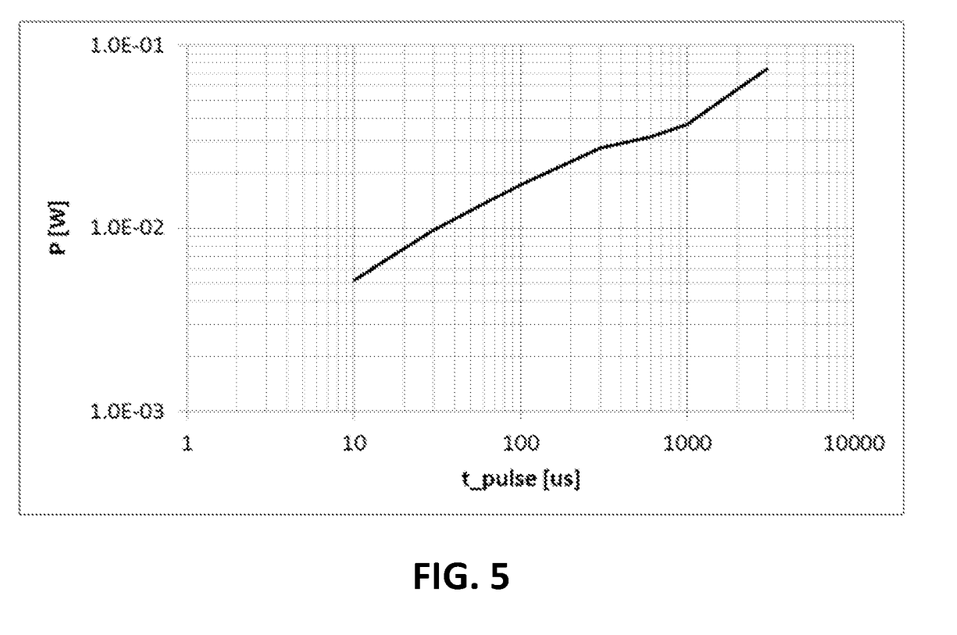
FIG. 5 shows an example of the safe operating area for a single energy pulse for an integrated clamp, defined by the maximum allowed power as function of the flyback pulse width.

FIG. 5 shows an example of the Safe Operating Area (SOA) for a single energy pulse for an integrated clamp, defined by the maximum allowed power as function of the flyback pulse width.

Figure 6:
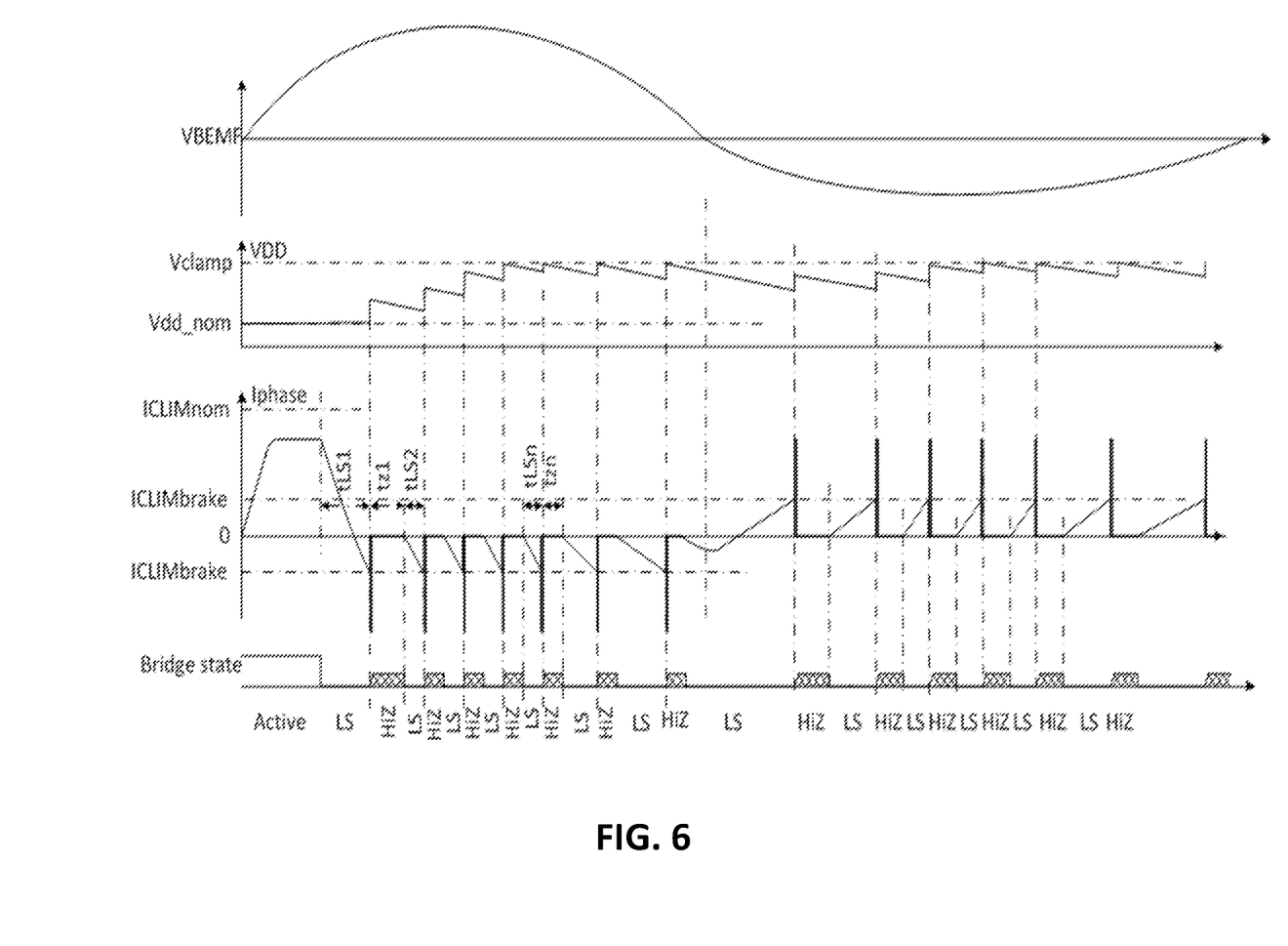
FIG. 6 shows traces of operational parameters obtained when driving a single coil brushless DC motor using a method or device implementing such a method, in accordance with embodiments of the present invention.

FIG. 6 shows traces of the BEMF voltage, the supply voltage VDD, the coil current, and the bridge state, when applying a method in accordance with an exemplary embodiment of the invention. In this example the motor is driven prior to braking the motor, thus the coil current is present in the active direction prior to braking.

In this implementation, first a freewheeling state is applied. During this freewheeling state, initially the phase current is decaying to zero. Once the current crosses zero, the BEMF voltage starts to induce generator mode current. When the generator mode current reaches ICLIMbrake, the H bridge driver is switched from freewheeling to high impedance state HiZ.

The time tLS1 refers to the time during which the H-bridge driver is freewheeling before the ICLIMbrake has been reached, and is defined by the ICLIMbrake value, the coil resistance and the BEMF voltage in the motor coil.

The flyback pulse, which follows the switch to HiZ, will charge the decoupling capacitors, and optionally triggers the clamping circuit.

During a time tz1 the supply voltage is drained with the normal current consumption of the driving electronics during HiZ. Optionally, a dedicated load may be switched on the supply to accelerate the discharge the voltage on the decoupling capacitance. During tz1 the clamp can cool down. As such tz1 is also referred to in this invention description as cool down time.

In the implementation shown in FIG. 6 the ICLIMbrake is fixed for all flyback pulses. tz1 can be set by the controller to a fixed value or a variable value, for instance depending on the signal indicative of the clamping structure temperature, or as a function of the evolution of the supply voltage on the decoupling capacitor. It can be noticed, that the supply voltage VDD is being pumped up at every flyback pulse. Depending on tLSn, tzn, ICLIMbrake value and the decoupling capacitor size, the VDD may be clamped by the supply clamp and the flyback pulse is being dissipated inside the clamp structure.

It can be noticed, that tLSn is varying as a function of the BEMF value at that moment of the motor rotation. When the BEMF voltage crosses zero, also the induced current will cross zero, and therefore tLSn will be longer, taking advantage to have longer period of freewheeling, without actual flyback pulse.

FIG. 6 shows different combinations of tLsn and tzn with a fixed current threshold ICLIMbrake. When this current threshold is crossed the controller switches from braking state to high impedance state. In this exemplary embodiment ICLIMbrake is selected such that the SOA is achieved for the smallest interval between flyback pulses, in other words the smallest interval which ensures for the selected ICLIMbrake, that the clamping function does not overheat.

A motor driver according to embodiments of the present invention may be configured for adjusting the current threshold in function of a signal indicative of an operating temperature of the clamping function 240 which is clamping the voltage generated by the flyback pulse.

The signal indicative of the clamping temperature may for example be:
- the number of pulses which trigger the clamp, within a predefined time span,
- a signal based on information on the state of the motor like motor speed, BEMF peak voltage, phase current, etc.
- an actual signal indicative of the clamp temperature, for instance for an integrated clamp the junction temperature sensor, or a signal indicative of the temperature of the motor coil. The motor driver may be integrated in an integrated circuit (IC). A temperature sensor may be part of the motor driver. In embodiments of the present invention the body diodes of the switching transistors may also give temperature information. As the on resistance of the switching transistor scales with temperature, also the on resistance of the switching transistor gives an indication of the temperature of the IC. The ohmic resistance of the motor coil may also be used as temperature indication of the motor, as it scales along with temperature. Also the magnets and the BEMF are temperature dependent. These measurements may be preceded by a calibration step at manufacturing in order to define the relationship between the measured parameter and the temperature.

The signal indicative of the clamp temperature may be scaling proportionally with the actual clamp temperature.

In embodiments of the present invention the iterations through a sequence of a braking state followed by a high impedance state are dimensioned (e.g. braking time, cool down time, current limit) such that the dissipation of heat caused by braking the motor is balanced between the clamping structure, the motor and an external load.

In embodiments of the present invention the cool down period may be achieved by a PWM controller. Hence part of the controller functionality is implemented using a PWM controller. The operation of the PWM controller may be interrupted based on a signal indicative of the motor temperature. This may for example be a signal indicative of the clamp temperature.

FIG. 7 shows signal traces obtained using a method in accordance with embodiments of the present invention with a first initial current threshold and an initial coasting time, wherein the initial coasting time ($t_{z1}$=tcoast) is larger than the subsequent cool down periods ($t_{zn}$) and wherein the absolute value of the initial current threshold (ICLIMbrake 1st) is larger than the absolute value of the subsequent current thresholds (ICLIMbrake). When a motor driver would be designed to implement this method a PWM controller may be used to define $t_{zn}$.

In an exemplary method according to embodiments of the present invention a timer may be applied which resets the high impedance state (HiZ) at the end of the PWM period, this way the cool down period (tzn) is limited to the PWM period tPWM. Maximizing the ratio tLSn/tzn maximizes the recirculation time, and therefore maximizes the braking speed. However, this also implies the interval time between subsequent flyback pulses is reduced, and therefore heating of the supply clamp will be increased. As such, the current limit level may have to be further reduced compared to implementations which allow for longer intervals between subsequent flyback pulses. For implementations with integrated current limit and integrated supply clamp, the nominal current limit ICLIMnom can be set to the maximum allowed level according to the SOA of the clamp for a single flyback pulse. As a consequence, such implementations which maximize the braking speed, may have to apply a variable ICLIM function, either by switching between different ICLIM structures, or by varying the threshold of one ICLIM structure.

Figure 8:
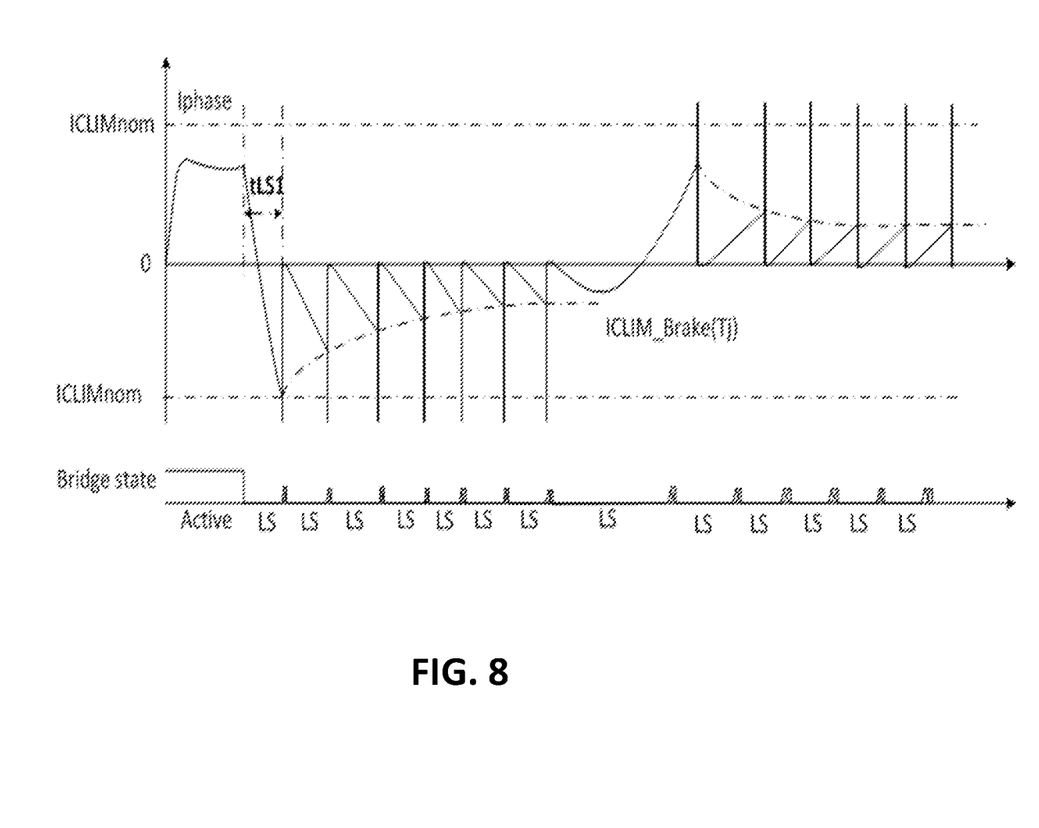
FIG. 8 shows traces of operational parameters obtained when driving a single coil brushless DC motor using a method or device implementing such a method, in accordance with embodiments of the present invention, wherein the current threshold is a function of the clamping structure temperature.

In the exemplary method, illustrated by the graphs in FIG. 8, ICLIMbrake is a function of the clamping structure temperature. For an integrated device, for example, the junction temperature can be used. For instance, in case of an integrated driver circuit with integrated clamping structure, the current limit level can be adjusted based on the integrated junction temperature sensor information. When a motor driver would be designed to implement this method a PWM controller may be used to define $t_{zn}$. An overtemperature protection structure may block the PWM controller of resetting the H-bridge output driver from Z to freewheeling, allowing a longer cool down time.

Because of the self-regulating structure of such implementations, the braking can be initiated immediately without taking any coasting time into account, and can be applied on wind milling conditions without considering a maximum speed limit.

It is noted that for coasting the motor is stopped by turning off all the FETs and Hi-Z the H bridge outputs. If the BEMF voltage is smaller than the motor voltage the motor is actually disconnected from the driver. The motor will coast to zero speed slowly by frictional force. If the BEMF voltage is larger than the motor voltage regenerating braking will take place at first due to the body diodes of the H bridge conducting, returning a minimal amount of energy to the supply. Coasting will not cause bus overshooting but doesn't stop the motor very quickly.

Even though braking can be initiated immediately without taking any coasting time into account, it can be understood, that this invention can be applied in combination with such coasting time, as shown in FIG. 7. Since in such case the first flyback pulse can be considered as a single pulse, the maximum ICLIMnom can be applied which is allowed according to the single pulse SOA.

In embodiments according to this invention first a freewheeling period tLS1 may be applied to avoid a first flyback pulse, and take advantage of the coasting effect while the phase current discharges and converts to generator mode current in order to reach the first CLIM_brake level. The current limit level which is applied on this first flyback pulse can be as high as ICLIMnom. However, if ICLIMnominal is at the edge of the clamps capability, it might be recommended to start with an ICLIMbrake which is about x*ICLIMnom in which x may for example range between 0.9 and 0.2 (x may for example be equal to 0.9 or 0.8 or 0.6 or 0.4 or 0.2).

In embodiments according to this invention, the switching in braking torque between freewheeling (high braking torque) and HiZ (low braking torque) induces vibrations in the motor. Especially for high inertia motors, which may take more than few 100 ms to brake, the audible noise may be significant, if the resulting switching frequency lies in the audible range. For implementations using a PWM controller, for instance with a 20 kHz PWM frequency, it is possible, that the resulting torque ripple has a frequency at 10 kHz or below.

Applying some random variation on the ICLIM will help to introduce more variation in the tLSn, such as to spread the torque ripple energy over a wider frequency band.

In a method according to embodiments of the present invention a freewheeling period may be initiated when the BEMF voltage is relatively low, such as to ensure a long freewheeling period, and minimum flyback pulse. For instance the freewheeling period (LS) may be initiated slightly before the BEMF zero crossing (see FIG. 6 wherein a freewheeling period starts before the BEMF zero crossing, and ends after the BEMF zero crossing), which can be predicted based on wind milling detection circuitry, or hall sensor position information, or by measuring the BEMF peak voltage. When the generator mode phase current reaches the ICLIMbrake threshold, the output driver switches from freewheeling to Z.

A current limit function has a typical blanking time of a few µs to avoid false triggering in normal operation due to current or voltage ringing. For an example PWM period of 40 µs, the smallest possible ratio between the high impedance period and the freewheeling period (tzn/tLSn) achievable this way is about 5%.

If the current rise time during freewheeling would result in a phase current which significantly exceeds the ICLIMbrake, the SOA may be exceeded. Therefore, for the braking function it may be revised to remove the blanking period, or the ICLIMbrake(Tj) function should be adjusted to anticipate such risks. Alternatively, in case the ICLIM is reached before the blanking time is expired, an extra cool down period may be applied, for instance by not switching to freewheeling in the next PWM period or a number of periods.

Since such conditions with very fast induction of generator mode current during freewheeling typically occur during the peak in the BEMF voltage during the initial EHPs after initiating the braking, in other embodiments of this invention, the controller may monitor the induced VBEMF, and decide to restart to braking until the BEMF has dropped below a certain level, or restart at the next BEMF ZC.

FIG. 9 shows a flow chart of an exemplary method 100 in accordance with embodiments of the present invention. The flow chart illustrates the braking method based on the iterative process of freewheeling until ICLIMbrake is reached, followed by switching 110 the bridge driver to the high impedance state HiZ, resulting in a flyback pulse which is absorbed. The high impedance stage is maintained during a cool down period (tz) after which the bridge driver is switched 120 back to freewheeling, until the motor has stopped rotating. In embodiments of the present invention the flow may also start with the high impedance state, even though that creates one flyback pulse extra.

A method according to embodiments of the present invention may comprise connecting a load parallel with the motor when a supply voltage of the motor reaches a first predefined voltage level and disconnecting the load when the supply voltage drops below a second predefined voltage level. A motor device according to embodiments of the present invention may be configured for executing such a method. It may therefore have an interface for measuring the supply voltage, and an interface for controlling a switch for connecting or disconnecting the load.

In embodiments of the present invention the first predefined voltage level and the second predefined voltage level may be the same.

In a preferred embodiment of the present invention, the range between first and second voltage levels is maximized, in order to benefit maximum from the offloading effect. The first predefined voltage level may be limited by the maximum breakdown voltage of the H-bridge driver. It can be any voltage level between the applied supply voltage VDD and this breakdown voltage. In embodiments of the present invention where the motor is clamped to a maximum voltage, the first predefined voltage level should be lower than the clamping voltage level.

In embodiments of the present invention the second voltage level may be above the nominal supply voltage, in order to avoid that the parallel load is taking energy from the supply. In case of hot unplug condition, there is no supply connected, such that the second voltage level may be as low as the undervoltage protection level, or may be down to the power down level.

The load may be the motor itself. In this case the current is reinjected into the motor at the right moment to avoid current flowing into the supply and make things worse. As a consequence the motor will be slightly accelerating again.

In embodiments of the present invention the load may be a resistive load with switch, or a linear regulated switch.

Figure 10:
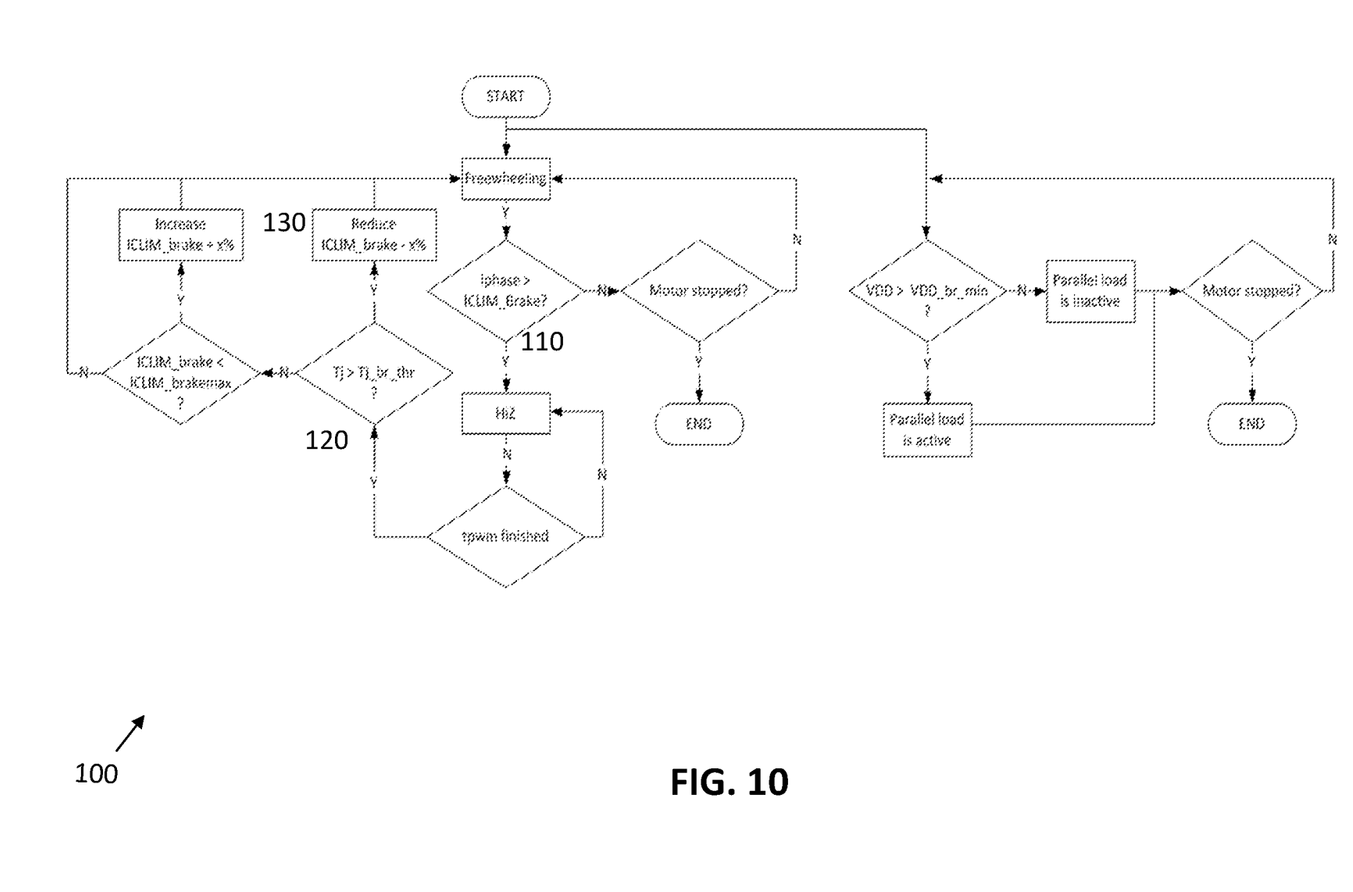
FIG. 10 shows a flow chart of an exemplary method in accordance with embodiments of the present invention, wherein the current threshold is a function of the temperature of the motor, and wherein a parallel is load is activated when the supply voltage exceeds a predefined threshold.

FIG. 10 shows a flow chart of an exemplary method in accordance with embodiments of the present invention. The flow chart illustrates an extended implementation, wherein the current threshold ICLIMbrake is dependent on the temperature of the motor Tj. Also in this implementation the transistors of the full bridge driver are switched 110 to high impedance mode HiZ when the phase current exceeds the current threshold. When the PWM period tpwm is finished the full bridge driver is switched 120 to the freewheeling state. In this example the absolute value of the current limit is increased if the signal indicative for the motor temperature is smaller than or equal to a predefined threshold value and if the maximum current threshold is not yet reached. If the signal indicative for the motor temperature is larger than a predefined threshold value the absolute value of the current threshold is reduced. There current threshold adjustments are done in step 130.

In the extended implementation of FIG. 10 a parallel load is activated when the supply voltage exceeds a predefined threshold (VDD_br_min) and deactivated when the supply voltage is smaller than the predefined threshold. In this exemplary embodiment one predefined voltage threshold is used. The invention is, however, not limited thereto. The parallel load may be activated when the supply voltage exceeds a first predefined threshold and deactivated when the supply voltage is smaller than a second predefined threshold, wherein the second predefined threshold is smaller than the first predefined threshold.

The invention claimed is:
1. A method for braking a single coil BLDC motor, the method comprising iterating a plurality of times through a sequence of:
   a braking state which lasts a braking period, and
   a high impedance state which lasts a cool down period,
      wherein current runs through the single coil during the braking state and wherein no current runs through the single coil during the high impedance state,
   wherein transiting from the braking state to the high impedance state is done when the motor operates in generator mode, and
   wherein transiting from the high impedance state to the braking state is done when the ratio of the cool down period and the braking period is at least 5%.

2. The method according to claim 1, wherein transiting from the braking state to the high impedance state is done when a current threshold is reached.

3. The method according to claim 1, the method comprising a clamping function for absorbing a flyback pulse induced by transiting from the braking state to the high impedance state such that a supply voltage of the motor is clamped to a maximum voltage.

4. The method according to claim 1 wherein the cool down period is adjusted in function of a signal indicative of an operating temperature induced by the clamping function.

5. The method according to claim 2, wherein the current threshold is adjusted in function of a signal indicative of an operating temperature induced the clamping function.

6. The method according claim 1, the method comprising connecting a load parallel with the motor when a supply voltage of the motor reaches a first predefined voltage level and disconnecting the load when the supply voltage drops below a second predefined voltage level.

7. A motor driver for driving a single coil BLDC motor, the motor driver comprising:
a controller,
a full bridge output driver comprising a pair of high side transistors and a pair of low side transistors connected with the single coil for controlling a current through the coil,
wherein the controller is configured for switching the transistors of the full bridge driver for braking the motor, thereby iterating a plurality of times through a sequence of a braking state which lasts a braking period and a high impedance state which lasts a cool down period, wherein current runs through the single coil during the braking state and wherein no current runs through the single coil during the high impedance state and wherein transiting from the braking state to the high impedance state is done when the motor operates in generator mode and wherein transiting from the high impedance state to the braking state is done when the ratio of the cool down period and the braking period is at least 5%.

8. The motor driver according to claim 7, wherein the controller is configured for switching the motor to a braking state by
switching on both high side transistors, both low side transistors, or switching on one high side transistor or one low side transistor, such that the current can recirculate through the transistor which is switched on, and the body diode of the opposing high side, respectively low side transistor, or by
active braking in which the transistors are switched such that a current path is generated by the BEMF voltage of the rotating motor, such that the motor is in generator mode.

9. The motor driver according to claim 7, the motor driver comprising a current limiter which is configured for triggering the controller to switch from the braking state to the high impedance state when the phase current reaches a current threshold.

10. The motor driver according to claim 7, the motor driver comprising a clamp which is configured for limiting a maximum voltage which is applied to the full bridge output driver, by providing a drain path to current caused by a flyback pulse induced by transiting from the braking state to the high impedance state.

11. The motor driver according to claim 8 wherein the cool down period is set by the controller.

12. The motor driver according to claim 8, the motor driver comprising a load, and the controller being configured for connecting the load parallel with the motor when a supply voltage of the motor reaches a first predefined voltage level and disconnecting the load when the supply voltage drops below a second predefined voltage level.

13. The motor driver according to claim 8 wherein control of the cool down period is achieved by a PWM controller.

14. The motor driver according to claim 8 wherein the controller is configured for adjusting the current threshold in function of a signal indicative of an operating temperature of the clamp.

* * * * *